No. 742,081. PATENTED OCT. 20, 1903.
J. E. STIERLE.
STRABISMUS GOGGLES.
APPLICATION FILED JAN. 22, 1903.

NO MODEL.

Witnesses

John E. Stierle, Inventor.
by C. A. Snow & Co.
Attorneys

No. 742,081. Patented October 20, 1903.

UNITED STATES PATENT OFFICE.

JOHN EVANGELIST STIERLE, OF MARSHFIELD, WISCONSIN.

STRABISMUS-GOGGLE.

SPECIFICATION forming part of Letters Patent No. 742,081, dated October 20, 1903.

Application filed January 22, 1903. Serial No. 140,138. (No model.)

*To all whom it may concern:*

Be it known that I, JOHN EVANGELIST STIERLE, a citizen of the United States, residing at Marshfield, in the county of Wood and State of Wisconsin, have invented a new and useful Strabismus-Goggle, of which the following is a specification.

This invention relates to certain improvements in devices for treating strabismus, and has for its principal object to provide a device in the nature of a pair of spectacles or eyeglasses by which the eye or eyes may be gradually straightened by a physical effort of the muscles of the eye.

A further object of the invention is to provide a device of this character which may be readily adjusted for treating one or other or both eyes, and a still further object is to provide means whereby lenses may be detachably secured to the frame either for the purpose of assisting vision or in the nature of smoked or colored glasses to protect the eyes when weakened from any cause.

With these and other objects in view the invention consists in the novel construction and arrangement of parts hereinafter described, illustrated in the accompanying drawings, and particularly pointed out in the appended claims, it being understood that various changes in the form, proportions, and minor details of the structure may be made without departing from the spirit or sacrificing any of the advantages of the invention.

Figure 1:
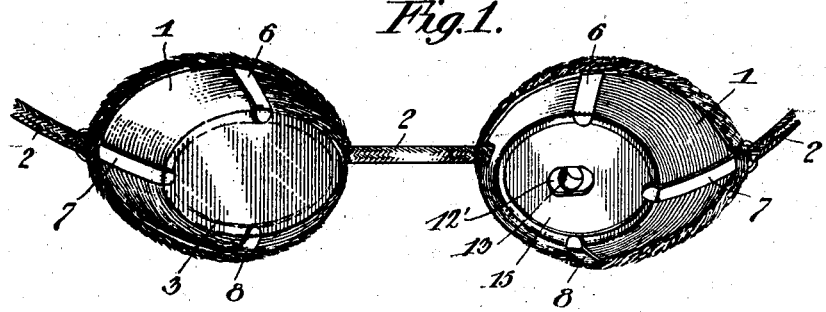
Figure 2:
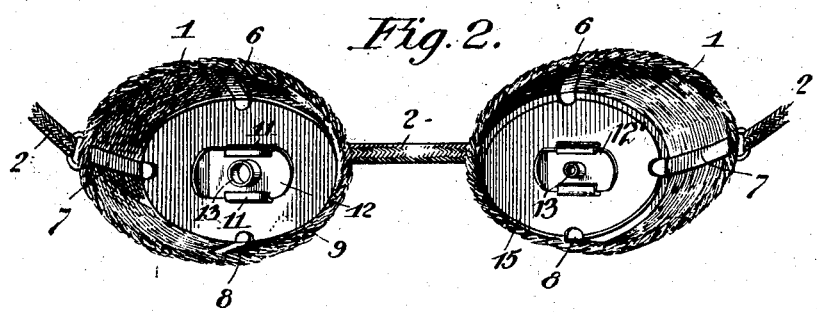
Figure 3:
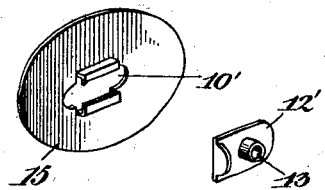
Figure 4:
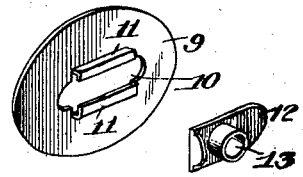
Figure 5:
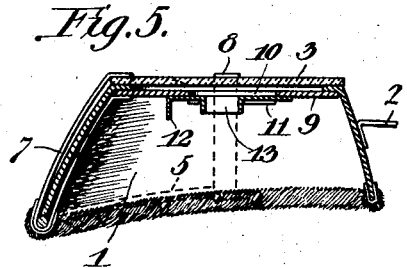
Figure 6:
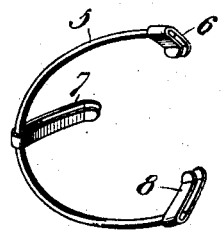

In the accompanying drawings, Figure 1 is a perspective view of a pair of spectacles embodying the invention. Fig. 2 is a similar view looking from the inside of the frames. Fig. 3 is a detail perspective view of one form of perforated plate which may be placed over a normal eye when only one eye is being treated. Fig. 4 is a similar view showing the form of plate and slide which it is preferred to employ for the affected eye. Fig. 5 is a detail sectional view through one of the frame members. Fig. 6 is a detail perspective view of the clamping means for holding the several plates and lenses in position.

Similar numerals of reference are employed to indicate corresponding parts throughout the several figures of the drawings.

The frames 1 are formed of perforated metal or other material or of wire-cloth and are of suitable shape and size to wholly inclose the eyes. The frame members are connected together in any suitable manner in order that they may be properly supported in position, as by bands 2, and their inner surfaces are blackened or tinted in such a manner as to avoid any reflection of light-rays. At the outer face of each frame is a small inturned flange, against the inner face of which may be held a suitable plate having a visual opening, and against the outer face of said flange there may be placed a lens 3 of any desired character, preferably of smoked or colored glass, as a protection to the eyes when under treatment. Secured to the edge of each of the frames is a half-loop or yoke-shaped member 5, which may be formed of a small section of wire, and secured to this member are three clamps 6, 7, and 8, each having two arms extending one inside the frame for the support of the plate and the other on the outside of the frame and terminating in a finger for the support of the lens. The three clamping members are arranged one at the outer end of the frame and the other two are disposed at diametrically opposite points at the vertical center of the frame. When the lens is to be used, it may be slipped in under the several fingers of the clamps from the inner end of the frame, the clamps engaging therewith and exerting sufficient friction to properly hold the lens in position, and one lens may be readily removed and another substituted, as the treatment of the case may require.

The device is intended principally for the treatment of strabismus by limiting the range of vision and make it necessary for the affected muscles to move the pupil of the eye into alinement with a sight-tube of limited area before the patient can discern an object. To this end I employ a plate having an opening and a slide covering said opening, the slide being provided with a small opening or tube which may be moved either to the right or left in accordance with the position of the pupil of the affected eye. When both eyes are to be treated, plates 9, having horizontal elongated openings 10, are placed in position between the flange of the ends of the inner clamping-arms, and each of these plates is provided with a pair of horizontally-disposed guides 11 for the reception of a slide 12, which may be adjusted longitudinally of the plate and is provided with a small opening or, preferably, an inwardly-projecting tube 13. The position of the slide depends altogether on the position of the pupil of the affected eye or eyes, and in practice it is preferred to place the slide so that its opening or tube shall be at a very slight angle to the abnormal angular position of the crystalline lens and retina of the eye, so that but a comparatively slight effort on the part of the patient will be required to bring the affected eye into alinement with the opening or tube. As the muscles become more accustomed to the strain the slide is further adjusted and gradually moved at intervals until the eyes have assumed normal positions. Where but one eye is affected and the other eye normal, the same plates and slide may be used in both frames, the one to be placed over the normal eye being disposed in a central position in order to avoid straining of the muscles of the unaffected eye.

In some cases the plate 15 (shown in Fig. 3) may be employed, said plate having an opening 10' of a length somewhat less than the opening 10 and being provided with a slide 12', having a sight-tube 13 in order to provide for such slight adjustment as may be necessary for different persons or as circumstances may require.

The frames may be made in quantities and supplied to opticians together with an assortment of plates, slides, and lenses and these fitted to the patients, the construction being such as to permit of the application of any desired form of plate, slide, or lens to the frame.

Having thus described the invention, what is claimed is—

1. In strabismus-goggles, a frame having an outer flange forming a support for inner interchangeable plates and for outer lenses, and clamping means coacting with said flange to retain the plates and lenses in position.

2. In strabismus-goggles, a frame, clamping means thereon, plates having visual openings and carried by the frame, and a detachable lens held in position in front of the plate by said clamping means.

3. In strabismus-goggles, a frame having an outer flange, clamps having arms extending on both sides of the frame, plates provided with visual openings held in position against the inner face of the flange by the clamping-arms, and a lens held against the outer face of the flange by the outer clamping-arms.

4. In strabismus-goggles, a frame having an outer flange, a metallic frame secured to the inner edge of each of the goggle-hoods, clamping-arms carried by said frame and extending to points both inside and outside the hoods, interchangeable plates held in position within the hoods by the inner clamping-arms, and lenses held to the outer ends of the hoods by the outer clamping-arms.

In testimony that I claim the foregoing as my own I have hereto affixed my signature in the presence of two witnesses.

JOHN EVANGELIST STIERLE.

Witnesses:
R. E. ANDREWS,
JOSEPH STIERLE.